US006680153B2

(12) United States Patent
Silence et al.

(10) Patent No.: US 6,680,153 B2
(45) Date of Patent: Jan. 20, 2004

(54) TONER COMPOSITIONS

(75) Inventors: Scott M. Silence, Fairport, NY (US); Edward J. Gutman, Webster, NY (US); Thomas R. Hoffend, Webster, NY (US)

(73) Assignee: Xerox Corporation, Stamford, CT (US)

( * ) Notice: Subject to any disclaimer, the term of this patent is extended or adjusted under 35 U.S.C. 154(b) by 36 days.

(21) Appl. No.: 10/152,884

(22) Filed: May 21, 2002

(65) Prior Publication Data

US 2003/0219668 A1 Nov. 27, 2003

(51) Int. Cl.[7] .................................................. G03G 9/09
(52) U.S. Cl. ................................. 430/108.21; 430/108.1
(58) Field of Search ........................... 430/108.1, 108.2, 430/108.9

(56) References Cited

U.S. PATENT DOCUMENTS

| | | | |
|---|---|---|---|
| 4,209,430 A | * 6/1980 | Weber ........................ | 260/23 |
| 4,560,635 A | 12/1985 | Hoffend et al. .......... | 430/106.6 |
| 4,621,039 A | 11/1986 | Ciccarelli et al. ............ | 430/106 |
| 4,752,550 A | 6/1988 | Barbetta et al. ......... | 430/106.6 |
| RE32,883 E | 3/1989 | Lu ............................... | 430/110 |
| 4,937,157 A | 6/1990 | Haack et al. ............... | 430/110 |
| 4,954,412 A | 9/1990 | Breton et al. ............... | 430/137 |
| 5,037,680 A | * 8/1991 | Papendick et al. ............ | 428/31 |
| 5,227,460 A | 7/1993 | Mahabadi et al. .......... | 528/272 |
| 5,348,832 A | 9/1994 | Sacripante et al. ......... | 430/109 |
| 5,352,556 A | 10/1994 | Mahabadi et al. .......... | 430/109 |
| 5,376,494 A | 12/1994 | Mahabadi et al. .......... | 430/137 |
| 5,395,723 A | 3/1995 | Mahabadi et al. .......... | 430/109 |
| 5,401,602 A | 3/1995 | Mahabadi et al. .......... | 430/137 |
| 5,585,423 A | * 12/1996 | Cohen et al. ................ | 524/102 |
| 5,593,807 A | 1/1997 | Sacripante et al. ......... | 430/137 |
| 5,604,076 A | 2/1997 | Patel et al. .................. | 430/137 |
| 5,648,193 A | 7/1997 | Patel et al. .................. | 430/137 |
| 5,658,704 A | 8/1997 | Patel et al. .................. | 430/137 |
| 5,660,965 A | 8/1997 | Mychajlowskij et al. ... | 430/137 |
| 5,840,462 A | 11/1998 | Foucher et al. ............. | 430/137 |
| 5,843,614 A | 12/1998 | Shinzo et al. ............... | 430/137 |
| 5,853,944 A | 12/1998 | Foucher et al. ............. | 430/137 |
| 5,951,750 A | * 9/1999 | Zimmermann et al. ..... | 106/417 |

* cited by examiner

*Primary Examiner*—John Goodrow
(74) *Attorney, Agent, or Firm*—E. D. Palazzo

(57) ABSTRACT

A composition comprised of resin and colorant, and wherein the colorant is stabilized with an ultra-violet stabilizer.

26 Claims, No Drawings

TONER COMPOSITIONS

The present invention is generally directed to toner compositions and processes thereof, and more specifically, the present invention relates to a toner comprised of resin, colorant, and stabilizer, such as a UV stabilizer. More specifically, the present invention is directed to toner compositions comprised of resin particles, such as polyesters and colorant particles, and which colorant particles are generated from adding a UV stabilizer to a formed colorant, such as a pigment wet cake, or which stabilizer can be added, for example, when the nonstabilizer treated colorant is dispersed in the toner resin. The colorant with UV stabilizer can be dispersed in a resin, such as a polyester resin, or the dispersion can be purchased in this form from a number of suppliers, such as Sun Chemicals. It is believed, although not desiring to be limited by theory, that the UV stabilizer surrounds or coats the colorant and wherein the stabilizer functions to primarily protect the colorant from UV induced changes, and which changes can adversely affect the colorant properties, especially the toner color intensity, lightfastness of the colorant, and result in an undesirable modification of the colorant structure, and thus the color or intensity of the colorant, especially with respect to magenta colorants, such as Rhodamine YS, Pigment Red 81:2, the silicomolybdic acid salt of Rhodamine YS, and the like.

The toners of the present invention can be selected for known electrophotographic imaging methods, and printing processes, including color processes, digital methods, and lithography.

REFERENCES

Toners with colorants, such as magenta pigments, and toner additives such as charge additives are known. Patents which disclose colored toners with quaternary ammonium salts as charge control additives are U.S. Pat. Nos. 4,621,039; 4,560,635; 4,338,390 (Re. 32,883); 4,937,157; and 4,752,550, the disclosure of which is totally incorporated herein by reference. There is illustrated in U.S. Pat. No. 4,954,412, the disclosure of which is totally incorporated herein by reference, a microsuspension process for the preparation of encapsulated toner compositions comprised of an olefinic polymer core and a shell comprised of a thermotropic liquid crystalline polyester resin.

Polyester based chemical toners substantially free of encapsulation are also known, reference U.S. Pat. No. 5,593,807, the disclosure of which is totally incorporated herein by reference, wherein there is illustrated, for example, a process for the preparation of a toner comprised of a sodio sulfonated polyester resin and pigment, and wherein the aggregation and coalescence of resin particles can be accomplished in the presence of an alkali halide. Other U.S. patents that may be of interest, the disclosures of which are totally incorporated herein by reference, may be U.S. Pat. Nos. 5,853,944; 5,843,614; 5,840,462; 5,604,076; 5,648,193; 5,658,704 and 5,660,965.

The appropriate processes and components of the above patents may be selected for the present invention in embodiments thereof.

SUMMARY OF THE INVENTION

It is a feature of the present invention to provide dry toner compositions comprised of a resin or polymer, a stabilized colorant, and toner additives, such as waxes, charge additives, silica additives, metal salts or metal salts of fatty acids, metal oxides, mixtures thereof, and the like.

In another feature of the present invention there are provided colorant particles stabilized by a UV (ultra-violet light) stabilizer, or similar stabilizer.

In a further feature of the present invention there are provided toners with stabilized colorants and wherein the lightfastness of the colorant is excellent, the color gamut wide, the colorant intensity high and uniform, and wherein the stabilizer is included in the colorant dispersion thereby minimizing potential adverse effects, such as the triboelectric charge of the toner, admix characteristics of the toner, charge through, and enabling a lower cost toner in embodiments and further in embodiments wherein the toner resin can be easily crosslinked since, for example, the UV stabilizer or other effective suitable stabilizer are primarily present at or near the surface of the colorant and not primarily in the resin.

Additionally, in another feature of the present invention there are provided toners comprised of a resin and colorant, and wherein there is selected a stabilizer, such as a UV stabilizer, which possesses low or substantially no solubility in the toner polymer and which stabilizer can be dispersed in the colorant dispersion to thereby prevent, or minimize migration of the stabilizer into the toner resin.

Also, in another feature of the present invention there are provided surface-treated toner particles with excellent fusing characteristics for digital color printing applications, low fusing temperatures of from about 130° C. to about 150° C., high gloss performance measuring greater than about 40, such as from about 40 to about 90, gloss units as measured on a Gardner gloss metering unit, and low vinyl offset.

Moreover, in another feature of the present invention there are provided toner compositions, which can possess a spherical morphology, nonspherical morphology or mixtures thereof with an average particle volume diameter of from about 1 to about 25 microns, and preferably from about 6 to about 12 microns, and with a narrow GSD of from about 1.12 to about 1.30 as measured by a Coulter Counter.

Additionally, in another feature of the present invention there are provided toner compositions with a high projection efficiency, such as from about 75 to about 95 percent efficiency as measured by the Match Scan II spectrophotometer available from Milton-Roy.

In a further feature of the present invention there are provided toner compositions which result in minimal, low or no paper curl.

Aspects of the present application relate to a process for the preparation of a toner comprised of mixing a stabilized colorant dispersion with a resin, and wherein the stabilized colorant dispersion is generated from a mixture of a colorant dispersion and a stabilizer; a toner comprised of a resin and a colorant, and wherein the colorant is stabilized with a suitable stabilizer; a composition comprised of resin and colorant, and wherein the colorant is stabilized with an ultraviolet stabilizer or similar suitable stabilizer; a toner comprised of resin and colorant, and wherein the colorant is stabilized with a UV component and which stabilized colorant is generated by mixing a colorant dispersion with the UV component; a toner wherein the colorant is a cyan, black, magenta, or yellow dispersion or mixtures thereof with from about 20 to about 60 weight percent of colorant solids in the resin as a masterbatch; a toner wherein the colorant is carbon black; a toner wherein the colorant is a dye; a toner wherein the colorant is a pigment; a toner wherein the colorant is comprised of cyan, yellow, magenta, black, green, orange, violet or brown, and the like wherein each colorant is present in an amount of from about 2 weight percent to about 18 weight percent of the final toner composition; a toner wherein the toner contains blended dry powder additives on the toner surface, and which additives are, for example, comprised of metal salts, metal salts of fatty acids, colloidal silicas, metal oxides, coated silicas available from DeGussa Chemicals, and the like, or mixtures thereof, and which additives are each optionally present in an amount of from about 0.1 to about 8 weight percent; a toner wherein the resin is a polyester resin present in an amount of from about 80 to about 98 percent by weight of the final toner composition; a toner wherein the colorant is a cyan, black, magenta, or alternatively a yellow dispersion or mixtures thereof with from about 80 to about 98 weight percent solids of resin and colorant, and wherein the colorant is stabilized with a UV stabilizer, or wherein a stabilizer is present as a protective coating on the colorant; a toner wherein the colorant is comprised of a mixture of a pigment and a dye; and a toner which contains surface additives comprised of metal salts, metal salts of fatty acids, colloidal silicas or metal oxides which additives are each present in an amount of from about 0.1 to about 8 weight percent.

Various stabilizers can be selected, such as benzophenones, benzotriazoles, salicylates, nickel organics, monobenzoates, formamidenes, oxalanilides, hindered phenols and the like, and which stabilizer is usually present in the colorant predispersion and wherein the predispersion can be formulated and is available, for instance, from Sun Chemicals. The colorant is present in the dispersion in an amount from, for example, about 20 to about 60 percent by weight, and more specifically, from about 30 to about 40 percent by weight; the stabilizer is present in the dispersion in an amount from, for example, about 0.1 to about 10 percent by weight, and more specifically, from about 0.5 to about 5 percent by weight; and the resin is present in the dispersion in an amount of, for example, from about 50 to about 79.9 percent by weight.

Examples of specific stabilizers are benzophenones such as 2,4-dihydroxy-benzophenone, 2-hydroxy-4-acryloyloxyethoxy-benzophenone (polymer), 2-hydroxy-4-methoxy-benzophenone, 2-hydroxy-4-methoxy-benzophenone-5-sulfonic acid, 2-hydroxy-4-octoxy-benzophenone, ethyl-2-cyano-3,3-diphenyl acrylate, 2-ethylhexyl-2-cyano-3,3-diphenyl acrylate, 2,2'-dihydroxy-4-methoxy-benzophenone; 2,2'-dihydroxy-4,4'-dimethoxy-benzophenone and the like; and 2,2',4,4'-tetrahydroxy-benzophenone; benzotriazoles such as 2-(2'-hydroxy-5'-methylphenyl)-benzotriazole, 2-(2'-hydroxy-3', 5'(1,1-dimethylbenzylphenyl)benzotriazole, 2-(2'-hydroxy-3',5'-di-t-amylphenyl)benzotriazole, 2-(5-chloro-2H-benzotriazol-2-yl)-6-(1,1-dimethylethyl)-4-methylphenol, 2-(2'-hydroxy-3,5'-ditertbutyl phenyl)-5-chlorobenzotriazole, 2-(2'-hydroxy-5-octylphenyl benzotriazole, bis[2-hydroxy-5-methyl-3-(benzotriazol-2-yl)phenyl]-methane, bis[2-hydroxy-5-t-octyl-3-(benzotriazol-2-yl)phenyl]methane; [2,4-hydroxy-3-(2H-benzotriazol-2-yl)-5-(1,1,3,3-tetramethylbutyl)-2'-n-octoxy-5'-benzoyl]diphenyl methane, 2-(2'-hydroxy-5'-methyl phenyl benzotriazole, 2-(2'-hydroxy-5-t-octyl phenyl benzotriazole, and 2-(2'-hydroxy-5'-methacrylyloxyethylphenyl)-2H-benzotriazol; monobenzoates such as resorcinol monobenzoate; formidenes such as $N^2$-(4-ethoxycarbonylphenyl)-$N^1$-methyl-$N^1$-phenylformamidene; oxalanilides such as (2-ethyl, 2'-ethoxy-oxalanilide), N-(2-ethoxyphenyl)-N-(4-isododecylphenyl)-ethanediamide, and the like, such as 2,4-di-t-butylphenyl-3,5-di-t-butyl-4-hydroxy benzoate, 3,5-ditertiary-butyl-p-hydroxy-benzoic acid, benzylidine malonate ester, bis(2,2,6,6-tetramethyl-4-piperidyl sebacate) and 3,5-di-t-butyl-4-hydroxybenzoic acid, hexadecyl ester and hindered amines, such as 1,3,5-triazine-2,4,6-triamine, N,N'"-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N"-dibutyl-N',N"-bis(1,2,2,6,6-pentamethyl-4-piperdinyl (Ciba Chimassorb 119), and 1,6-hexanediamine, N,N'-bis(2,2,6,6-tetramethyl-4-piperdinyl)-polymer with 2,4,6-trichloro-1,3,5-triazine, reaction products with N-butyl-1-buta-amine and N-butyl-2,2,6,6-tetramethyl-4-piperidinamine (Ciba Chimassorb 2020) and the like; cinnamates, such as 2-ethylhexyl-p-methoxycinnamate, and the like; sterically hindered amines, such as BASF UVINUL™ 4049 H and polymethyl[propyl-3-oxy(2,2,6,6-tetramethyl)-4-piperidinyl]siloxane (Great Lakes Chemical UVASIL™ 299HM/299LM) and bis-(1-octyloxy-2,2,6,6-tetramethyl-4-piperidinyl)sebacate (Ciba Tinuvin 123) and bis(2,2,6,6-tetramethyl)-4-piperidinyl) sebacate (Great Lakes Chemical Lowilite 77), and the like.

The stabilizer in embodiments forms a coating or shell on the colorant by, for example, physisorption or chemisorption; optionally the stabilizer could chemically react with the surface of the colorant providing that the optical properties of the colorant are not substantially changed by the chemical reaction. The distribution of the stabilizer in the dispersion is such that the majority of the stabilizer is in direct contact with the colorant; that is, the regions of isolated stabilizer domains in the dispersion are minimized.

The stabilizer can be retained on the colorant and not, it is believed, substantially attracted to the toner resin by suitable choice of stabilizer solubility in the resin used in the dispersion, for example a polyester. Specifically, the stabilizer should possess low or negligible solubility in the resin dispersion resin and substantially no chemical reactivity with the dispersed resin such that the probability of adsorption of the stabilizer on the surface of the colorant is of greater probability than the solubility of the stabilizer in the resin.

The stabilizer can be present in the dispersion in various suitable amounts, for example, in an amount of from about 0.1 to about 10 percent by weight, and preferably from about 0.5 to about 5 percent by weight. The resulting stabilizer concentration in the toner is, for example, from about 0.01 percent to about 2.5 percent by weight, preferably from about 0.05 percent to about 1.2 percent by weight.

A number of resins can be selected, such as styrene acrylates, styrene methacrylates, styrene butadienes, other styrene polymers and copolymers, and terpolymers, polyacrylates and polymethacrylates, and their copolymers and terpolymers, polyesters, polyamides, polyamines, polycarbonates, polyester-styrene/acrylate hybrid polymers, polyester-styrene/methacrylate hybrid polymers and other known toner resins. The polyester is, for example, the polyesters as illustrated in U.S. Pat. No. 3,590,000, the crosslinked polyesters of U.S. Pat. Nos. 5,376,494; 5,395,723; 5,401,602; 5,227,460, and 5,352,556, the disclosures of which are totally incorporated herein by reference in their entireties. Moreover, the polyesters of U.S. Pat. Nos. 5,348,832; 5,853,944; 5,840,462; 5,660,965; 5,658,704; 5,648,193, and 5,593,807, the disclosures of each patent being totally incorporated herein by reference, can in embodiments be selected as the toner resin. Any polyester having the appropriate glass transition temperature, and melt viscosity—temperature profile (resulting from the molecular weight and molecular weight distribution of the polyester) can also be selected.

Specific examples of crosslinked polyesters can be generated with a liquid initiator, and which polyesters are comprised of crosslinked portions and linear portions. The crosslinked portions comprise very high molecular weight gel particles having average diameter less than about 0.1 micron and with high density crosslinking insoluble in substantially any solvent, including tetrahydrofuran, toluene, and the like. The linear portion comprises low molecular weight resin soluble in various solvents, such as for example tetrahydrofuran, toluene and the like, and the high molecular weight highly crosslinked gel particles, are substantially uniformly distributed in the linear portions. Substantially no portion of the resin comprises sol or low density crosslinked polymer, such as that which would be obtained in conventional crosslinking processes, such as polycondensation, bulk, solution, suspension, emulsion and dispersion polymerization processes.

The crosslinked polyester may be fabricated by a reactive melt mixing process. In this process, a reactive base resin, preferably unsaturated polyester resin, is partially crosslinked at high temperature and under high shear, preferably by using chemical initiators. More specifically, the present invention provides a single component toner containing a low fix temperature toner resin, and specifically a low fix temperature toner resin based on crosslinked resin comprised of crosslinked and linear portions, the crosslinked portion consisting essentially of microgel particles with an average volume particle diameter up to 0.1 micron, preferably about 0.005 to about 0.1 micron, said microgel particles being substantially uniformly distributed throughout the linear portions. This resin may be prepared by a reactive melt mixing, reference for example, U.S. Pat. No. 5,376,494, the disclosure of which is hereby totally incorporated herein by reference. In this patent the resin illustrated can be comprised of a crosslinked portion consisting essentially of microgel particles, preferably up to about 0.1 micron in average volume particle diameter as determined by scanning electron microscopy and transmission electron microscopy. When produced by a reactive melt mixing process wherein the crosslinking occurs at high temperature and under high shear, the size of the microgel particles does not continue to grow with increasing degree of crosslinking. Also, the microgel particles are distributed substantially uniformly throughout the linear portion.

Also, the polyester toner resin possesses, for example, a weight fraction of the microgel (gel content) in the resin mixture in the range typically from about 0.001 to about 50 weight percent, preferably about 0.1 to about 40. The linear portion is comprised of base resin, preferably unsaturated polyester, in the range from about 50 to about 99.999 percent by weight of said toner resin, and preferably in the range from about 60 to about 99.9 percent by weight of said toner resin. The linear portion of the resin preferably consists essentially of low molecular weight reactive base resin which did not crosslink during the crosslinking reaction, preferably unsaturated polyester resin. The number-average molecular weight ($M_n$) of the linear portion as measured by gel permeation chromatography (GPC) is in the range typically of from about 1,000 to about 20,000, and preferably from about 2,000 to about 5,000. The weight-average molecular weight ($M_w$) of the linear portion is in the range of typically from about 2,000 to about 40,000, and preferably from about 4,000 to about 15,000. The molecular weight distribution ($M_w/M_n$) of the linear portion is in the range typically of from about 1.5 to about 6, and preferably from about 2 to about 4. The onset glass transition temperature (Tg) of the linear portion as measured by differential scanning calorimetry (DSC) for preferred embodiments is in the range typically from about 50° C. to about 70° C., and preferably from about 51° C. to about 60° C. Melt viscosity of the linear portion of preferred embodiments as measured with a mechanical spectrometer at 10 radians per second is from about 5,000 to about 200,000 poise, and preferably from about 20,000 to about 100,000 poise, at 100° C. and drops sharply with increasing temperature to from about 100 to about 5000 poise, and preferably from about 400 to about 2,000 poise, as temperature rises from 100° C. to 130° C.

The polyester toner resin can contain a mixture of crosslinked resin microgel particles and a linear portion as illustrated herein. In embodiments of the toner resin of the invention, the onset Tg is in the range typically of from about 50° C. to about 70° C., and preferably from about 51° C. to about 60° C., and the melt viscosity as measured with a mechanical spectrometer at 10 radians per second is from about 5,000 to about 200,000 poise, and preferably from about 20,000 to about 100,000 poise, at 100° C. and from about 10 to about 20,000 poise at 160° C. The low fix temperature of the toner resin of this invention is a function of the molecular weight and molecular weight distribution of the linear portion, and is not affected by the amount of microgel particles or degree of crosslinking; reference, for example, generated proximity viscosity curves; at a lower temperature, such as, for example, at 100° C., the melt viscosity is in the range of from about 20,000 to about 100,000 poise as measured with a mechanical spectrometer at 10 radians per second. The hot offset temperature is increased with the presence of microgel particles which impart elasticity to the resin. With a higher degree of crosslinking or microgel content, the hot offset temperature increases. This is reflected in divergence of the viscosity curves at high temperature, such as, for example, at 160° C., in which the melt viscosity is typically in the range of from about 10 to about 20,000 poise as measured at 10 radians per second depending on the amount of microgel particles in the resin.

Crosslinked polyesters as illustrated herein can provide a low melt toner with a minimum fix temperature of from about 100° C. to about 200° C., more specifically about 100° C. to about 160° C., and more specifically about 110° C. to about 140° C., provide the low melt toner with a wide fusing latitude to minimize or prevent offset of the toner onto the fuser roll, and maintain high toner pulverization efficiencies. The low melt toner resin more specifically has a fusing latitude greater than 10° C., more specifically from about 10° C. to about 120° C., and more specifically more than about 20° C. and even more specifically more than about 30° C. The MFT of the toner is not believed to be sensitive to the crosslinking in the microgel particles of the toner resin, while the fusing latitude increases significantly as a function of the crosslinking or content of microgels in the toner resin. Thus, it is possible to produce a series of toner resins and thus toners with the same MFT, but with different fusing latitudes. Toner resins and thus toners of the present invention in embodiments evidence minimal or substantially no vinyl offset.

As the degree of crosslinking or microgel content increases, the low temperature melt viscosity does not change appreciably, while the high temperature melt viscosity goes up. In an exemplary embodiment, the hot offset temperature can increase approximately 30 percent. This can be achieved by crosslinking in the melt state at high temperature and high shear such as, for example, by crosslinking an unsaturated polyester using a chemical initiator in an extruder resulting in the formation of microgel alone, distributed substantially uniformly throughout the linear portion, and substantially no intermediates or sol portions which are crosslinked polymers with low crosslinking density. When crosslinked intermediate polymers can be generated by conventional polymerization processes, and the viscosity curves thereof generally shift in parallel from low to high, which is reflected in increased hot offset temperature, and increased minimum fix temperature.

The polyester crosslinked portion consists essentially of very high molecular weight microgel particles with high density crosslinking (as measured by gel content) and which are not soluble in substantially any solvents, such as, for example, tetrahydrofuran, toluene, and the like. As discussed above, the microgel particles are highly crosslinked polymers with a very small, if any, crosslink distance. This type of crosslinked polymer may be formed by reacting a liquid chemical initiator with linear unsaturated polymer, and more specifically, linear unsaturated polyester at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly crosslinked microgel. This renders the microgel very dense and results in the microgel not swelling very well in solvent. The dense microgel also imparts elasticity to the resin and increases its hot offset temperature while not affecting its minimum fix temperature.

The weight fraction of the microgel (gel content) in the resin may be defined as follows:

$$\text{Gel Content} = \frac{(\text{Total Sample Weight}) - (\text{Weight of Soluble Polymer}) \times 100}{\text{Total Sample Weight}}$$

The gel content may be calculated by measuring the relative amounts of linear, soluble polymer and the nonlinear, crosslinked polymer utilizing the following procedure: (1) the sample of the crosslinked resin to be analyzed, in an amount between 145 and 235 milligrams, is weighed directly into a glass centrifuge tube; (2) 45 milliliters of toluene are added and the sample is put on a shaker for at least 3 hours, preferably overnight; (3) the sample is then centrifuged at about 2,500 rpm for 30 minutes and then a 5 milliliter aliquot is carefully removed and put into a pre-weighed aluminum dish; (4) the toluene is allowed to air evaporate for about 2 hours, and then the sample is further dried in a convection oven at 60° C. for about 6 hours or to constant weight; and (5) the sample remaining, times nine, gives the amount of soluble polymer. Thus, utilizing this quantity in the above equation, the gel content can be easily calculated.

Examples of linear unsaturated polyesters selected as the base resin are low molecular weight condensation polymers which may be formed by the reactions between both saturated and unsaturated diacids (or anhydrides) and dihydric alcohols (glycols or diols). The resulting unsaturated polyesters are reactive (e.g., crosslinkable) on two fronts: (i) unsaturation sites (double bonds) along the polyester chain; and (ii) functional groups such as carboxyl, hydroxy, etc. groups amenable to acid-base reactions. Typical unsaturated polyester base resins useful for this invention are prepared by melt polycondensation or other polymerization processes using diacids and/or anhydrides and diols. Suitable diacids and dianhydrides include but are not limited to saturated diacids and/or anhydrides, such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like, and mixtures thereof; and unsaturated diacids and/or anhydrides, such as for example maleic acid, fumaric acid (mesaconic acid), chloromaleic acid, itaconic acid, citraconic acid, maleic anhydride, and the like, and mixtures thereof. Suitable diols include but are not limited to, for example, propylene glycol, ethylene glycol, diethylene glycol, neopentyl glycol, dipropylene glycol, dibromoneopentyl glycol, propoxylated bisphenol-A, 2,2,4-trimethylpentane-1,3-diol, tetrabromo bisphenol dipropoxy ether, 1,4-butanediol, and the like, and mixtures thereof. Preferred unsaturated polyester base resins are prepared from diacids and/or anhydrides, such as, for example, maleic anhydride, fumaric acid, and the like, and mixtures thereof, and diols, such as, for example, propoxylated bisphenol-A, propylene glycol, and the like, and mixtures thereof. A particularly preferred polyester is poly (propoxylated bisphenol A fumarate).

Substantially any suitable unsaturated polyester can be used to generate the toner resins, including unsaturated polyesters known for use in toner resins and including unsaturated polyesters whose properties previously made them undesirable or unsuitable for use as toner resins (but which adverse properties are eliminated or reduced by preparing them in the example of the partially crosslinked form of the present invention).

The crosslinking is characterized by at least one reactive site (e.g., one unsaturation) within a polymer chain reacting substantially directly (e.g., with no intervening monomer(s)) with at least one reactive site within a second polymer chain, and by this reaction occurring repeatedly to form a series of crosslinked units. This polymer crosslinking reaction may occur by a number of mechanisms. Without intending to be bound by theory, it is believed that the crosslinking may occur through one or more of the following mechanisms.

For example, when an exemplary propoxylated bisphenol A fumarate unsaturated polymer undergoes a crosslinking reaction with a chemical crosslinking initiator, such as, for example, 1,1-di-(tertiary-butylperoxy)cyclohexane, a liquid initiator, free radicals produced by the chemical initiator. This manner of crosslinking between chains will produce a large, high molecular weight molecule, ultimately forming a gel. In preferred embodiments of this exemplary polyester, m1 and m2 are at least 1 and the sum of m1 and m2 is not greater than 3, or m1 and m2 are independently 1–3, and n is approximately 8 to 11. By a second mechanism, crosslinking may occur between chains of the same exemplary molecule where the free radicals formed from a chemical crosslinking initiator attack the carbon of the propoxy group by hydrogen abstraction of a tertiary-hydrogen.

Chemical initiators, such as, for example, organic peroxides or azo-compounds, are preferred for making the crosslinked toner resins of the invention. Suitable organic peroxides include diacyl peroxides, such as, for example, decanoyl peroxide, lauroyl peroxide and benzoyl peroxide, ketone peroxides, such as, for example, cyclohexanone peroxide and methyl ethyl ketone, alkyl peroxyesters, such as, for example, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy)hexane, oo-t-butyl o-(2-ethyl hexyl)mono peroxy carbonate, and oo-t-amyl o-(2-ethyl hexyl)mono peroxy carbonate, alkyl peroxides, such as, for example, dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy) hexyne-3, alkyl hydroperoxides, such as, for example, 2,5-dihydro peroxy 2,5-dimethyl hexane, cumene hydroperoxide, t-butyl hydroperoxide and t-amyl hydroperoxide, and alkyl peroxyketals, such as, for example, n-butyl 4,4-di(t-butyl peroxy)valerate, 1,1-di(t-butyl peroxy)3,3,5-trimethyl cyclohexane, 1,1-di(t-butyl peroxy) cyclohexane, 1,1-di(t-amyl peroxy)cyclohexane, 2,2-di(t-butyl peroxy)butane, ethyl 3,3-di(t-butyl peroxy)butyrate and ethyl 3,3-di-(t-amyl peroxy) butyrate. Suitable azo compounds include azobis-isobutyronitrile, 2,2'-azobis (isobutyronitrile), 2,2'-azobis(2,4-dimethyl valeronitrile), 2,2'-azobis(methyl butyronitrile), 1,1'-azobis(cyano cyclohexane) and other similar known compounds. By permitting use of low concentrations of chemical initiator and utilizing all of it in the crosslinking reaction, usually in the range of from about 0.01 to about 10 weight percent, and more specifically, in the range from about 0.1 to about 4 weight percent, the residual contaminants produced in the crosslinking reaction in preferred embodiments can be minimal. Since the crosslinking can be accomplished at high temperature, the reaction is very fast (e.g., less than 10 minutes, preferably about 2 seconds to about 5 minutes residence time) and thus little or no unreacted initiator remains in the product.

Examples of initiators selected in embodiments of the present invention are 1,1-bis-(t-butylperoxy)-3,3,5-trimethyl-cyclohexane, (OO-tert-butyl O-(2-ethylhexyl) monoperoxycarbonate), dialkyl peroxides, such as L101 (2,5-dimethyl 2,5-di(t-butylperoxy)hexane), L801 t-butyl cumyl peroxide, L130 (2,5-dimethyl-2,5-di(t-butylperoxy) hexyne-3), and di-t-butyl peroxide; peroxyketals, such as L231, L230 (n-butyl-4,4-bis(t-butylperoxy)valerate), and L531 (1,1-di-(t-amylperoxy)cyclohexane); peroxyesters, such as TBEC, t-butyl perbenzoate (t-butylperoxy benzoate), L256 (2,5-dimethyl 2,5-di(2-ethylhexanoyl peroxy)hexane), L575 (t-amylperoxy-2-ethyl-hexanoate), and t-amyl perbenzoate (t-amyl peroxy-benzoate); and monoperoxycarbonates such as TAEC (OO-t-amyl O-(2-ethylhexyl)-monoperoxy carbonate).

The toners and toner resins may be prepared by a reactive melt mixing process wherein reactive resins are partially crosslinked. For example, low melt toner resins and toners may be fabricated by a reactive melt mixing process comprising the steps of (1) melting reactive base resin, thereby forming a polymer melt, in a melt mixing device; (2) initiating crosslinking of the polymer melt with certain liquid chemical crosslinking initiator and increased reaction temperature; (3) retaining the polymer melt in the melt mixing device for a sufficient residence time that partial crosslinking of the base resin may be achieved; (4) providing sufficiently high shear during the crosslinking reaction to retain the gel particles formed during crosslinking small in size and well distributed in the polymer melt; and (5) optionally devolatilizing the polymer melt to remove any effluent volatiles. The high temperature reactive melt mixing process allows for very fast crosslinking which enables the production of substantially only microgel particles, and the high shear of the process prevents undue growth of the microgels and enables the microgel particles to be uniformly distributed in the resin.

In embodiments, the process comprises the steps of (1) feeding base resin and certain liquid initiators to an extruder; (2) melting the base resin, thereby forming a polymer melt; (3) mixing the molten base resin and initiator at low temperature to enable good dispersion of the initiator in the base resin before the onset of crosslinking; (4) initiating crosslinking of the base resin with the initiator by raising the melt temperature and controlling it along the extruder channel; (5) retaining the polymer melt in the extruder for a sufficient residence time at a given temperature such that the required amount of crosslinking is achieved; (6) providing sufficiently high shear during the crosslinking reaction thereby keeping the gel particles formed during crosslinking small in size and well distributed in the polymer melt; (7) optionally devolatilizing the melt to remove any effluent volatiles; and (8) pumping the crosslinked resin melt through a die to a pelletizer.

The resin is generally present in the toner in an amount of from about 80 to about 97 percent by weight, and more specifically, from about 85 to about 95 percent by weight, although the resin may be present in greater or lesser amounts. For example, toner resins of the present invention in embodiments thereof can be subsequently melt blended or otherwise mixed with certain colorants which contain stabilizers, charge additives, surfactants, emulsifiers, pigment dispersants, flow additives, and the like. The resultant product can then be pulverized by known methods, such as milling, to form toner particles. The toner particles preferably have an average volume particle diameter of about 5 to about 25, more specifically, about 5 to about 15 microns.

Various known colorants, especially pigments, present in the toner in an effective amount of, for example, from about 1 to about 65, and more specifically, from about 2 to about 35 percent by weight of the toner, and more specifically, in an amount of from about 1 to about 15 weight percent, and wherein the total of all toner components is about 100 percent, include carbon black like REGAL 330®; magnetites such as Mobay magnetites MO8029™, MO8060™; and the like. As colored pigments, there can be selected known cyan, magenta, yellow, red, green, brown, blue or mixtures thereof. Specific examples of colorants, especially pigments, include phthalocyanine HELIOGEN BLUE L6900™, D6840™, D7080™, D7020™, cyan 15:3, magenta Red 81:3, Yellow 17, Yellow 180, the pigments of U.S. Pat. No. 5,556,727, the disclosure of which is totally incorporated herein by reference, and the like. Examples of specific magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of specific cyans that may be selected include copper tetra (octadecyl sulfonamido)phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative specific examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, such as pigments, selected can be flushed pigments as indicated herein.

More specifically, colorant examples include Pigment Blue 15:3 having a Color Index Constitution Number of 74160, magenta Pigment Red 81:3 having a Color Index Constitution Number of 45160:3, and Yellow 17 having a Color Index Constitution Number of 21105, and known dyes such as food dyes, yellow, blue, green, red, magenta dyes, and the like. Colorants include pigments, dyes, mixtures of pigments, mixtures of dyes, and mixtures of dyes and pigments, and the like, and preferably pigments. Dry powder additives that can be added or blended onto the surface of the toner compositions, more specifically, after washing or drying include, for example, metal salts, metal salts of fatty acids, colloidal silicas, metal oxides like titanium, tin and the like, mixtures thereof, and the like, which additives are each usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and flow aids, such as fumed silicas like AEROSIL R972® available from Degussa, or silicas available from Cabot Corporation or Degussa Chemicals, the coated silicas of U.S. Pat. Nos. 6,004,714 and 6,190,815, and the like, each in amounts of from about 0.1 to about 2 percent, which can be added during the aggregation process or blended into the formed toner product.

For further enhancing the positive charging characteristics of the developer compositions described herein, and as optional components there can be incorporated into the toner or on its surface charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate; bisulfates, and the like, and other similar known charge enhancing additives. Also, negative charge enhancing additives may also be selected, such as aluminum complexes, like BONTRON E-88®, and the like. These additives may be incorporated into the toner in an amount of from about 0.1 percent by weight to about 20 percent by weight, and preferably from 1 to about 3 percent by weight.

Developer compositions can be prepared by mixing the toners with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,990, the disclosure of which is totally incorporated herein by reference.

The following Examples are being submitted. These Examples are intended to be illustrative only and are not intended to limit the scope of the present invention. Parts and percentages are by weight unless otherwise indicated.

EXAMPLE I

Seven hundred (700) grams of a linear propoxylated bisphenol A fumarate resin referred to as Resapol HT were heated to approximately 80° C. To this resin was added approximately 600 grams of a Pigment Red 81:2 wetcake, which consisted of approximately 150 grams of Pigment Red 81:3 red pigment and approximately 450 grams of water. The resin and wetcake mixture was blended in a high-shear kneading device for a time sufficient to allow the water in the mixture to rise to the surface and be decanted off. An additional 300 grams of the above wetcake was added to the mixture and kneaded a second time to allow the water in the mixture to move to the surface and be decanted off. The process was repeated a third time with a final addition of 300 grams of the wetcake and after the third decanting of water, 3 grams of UVINUL™ 3088 UV stabilizer were added to the mixture. This stabilizer, a tetra-substituted benzophenone 2-ethylhexyl p-methoxy cinnamate, was a clear, colorless low viscosity liquid that was immiscible in water and thermally stable to 300° C. and was available from BASF. Following the addition of the UVINUL™ 3088, the temperature of the mixture was increased to 100° C. (degrees Centigrade) and a vacuum was applied to the mixture to remove the remaining water from the dispersion. The final dispersion was comprised of approximately 69 percent by weight of the above linear polyester resin, approximately 30 percent by weight of Pigment Red 81:2, and approximately 1 percent by weight of UVINUL™ 3088, and it was believed that primarily because of the limited compatibility of the UVINUL™ 3088 with the polyester resin, the UVINUL™ 3088 could effectively coat the red colored pigment particles. In the second step of the process, 70.3 Parts by weight of the resin Resapol HT from above, 14 parts by weight of a 30 weight percent gel polyester resin, and 15.7 parts by weight of the predispersion containing Pigment Red 81:2 and UVINUL™ 3088, were blended together and extruded in a ZSK-40 extruder. The extruded blend was then jetted and classified to form a magenta toner (with 96.7 weight percent of resin and 4.7 weight percent of P.R. 81:2) with a toner particle size of about 7.3 microns as measured by a Layson Cell. The final magenta toner had a gel concentration of about 5 weight percent.

In the third step, a toner blend was prepared by mixing the magenta toner above with 0.6 weight percent of TS530 treated silica obtained from Cabot Corporation, 1.5 weight percent of P25 untreated titania, and 0.3 weight percent of zinc stearate L obtained from Ferro Corporation. The mixing was accomplished using a 10 liter Henschel vertical blender at 2,360 rpm for a blend time of 4 minutes. The carrier, which was paired with the toner to generate a developer, was comprised of a 50 micron diameter Mn-Mg-Sr ferrite core particle coated with 0.4 percent by weight of a polymer mixture, with the polymer mixture containing 95 percent polymethylmethacrylate and 5 percent KYNAR® 301F by weight. The developer was comprised of 96 percent carrier and 4 percent toner on a weight basis. The developer was then installed in a DocuColor 70 machine and in a normal machine operating mode to generate print samples.

The print samples were then exposed in an industry standard Xenon accelerated fadeometer test that simulates daylight through a window and evaluated for dE color differences. Reflection color measurements were tested before and after exposure corresponding to 0, 24, and 72 hour exposure intervals. The color difference between the unexposed (cardboard masked) and exposed image at each exposure time was less than about 5 dE units.

Comparative Example 1

The toner, developer, and print samples of Example I were generated by repeating the process thereof except that no stabilizer of UVINUL™ 3088 was included in the first step of the process.

The print samples were then exposed in the industry standard Xenon accelerated fadeometer test that simulates daylight through a window and evaluated for dE color differences. Reflection color measurements were again tested before and after exposure corresponding to 0, 24, and 72 hour exposure intervals. The color differences between the unexposed (cardboard masked) and exposed image were 15.6 and 20.8 dE units at 24 and 72 hour exposure times, respectively.

EXAMPLE II

In the first step, 700 grams of a linear propoxylated bisphenol A fumarate resin referred to as Resapol HT were heated to approximately 80° C. To this resin was added approximately 600 grams of a Pigment Red 81:2 wetcake of approximately 150 grams of Pigment Red 81:3 pigment and approximately 450 grams of water. The resin and wetcake mixture was blended in a high-shear kneading device for a time sufficient to allow the water in the mixture to rise to the surface and be decanted off. An additional 300 grams of wetcake were added to the mixture and kneaded a second time to allow the water in the mixture to rise to the surface and be decanted off. The process was repeated a third time with a final addition of 300 grams of wetcake and after the third decanting of water, 1 gram of UVINUL™ 4049 H UV stabilizer was added to the mixture. This stabilizer, a sterically hindered amine monomer, was a white powder that has low solubility in water and was thermally stable to 268° C., the decomposition temperature, and was available from BASF. Following the addition of the UVINUL™ 4049 H, the temperature of the mixture was raised to 100° C. and a vacuum was applied to the mixture to remove the remaining water from the dispersion. The final dispersion was comprised of approximately 69.7 percent by weight of the linear polyester resin, approximately 30 percent by weight of Pigment Red 81:2, and approximately 0.3 percent by weight of UVINUL™ 3088, and it is believed that due to the limited compatibility of the UVINUL™ 4049 H with the polyester resin, the UVINUL™ 4049 H will substantially fully coat the pigment particles. In the second step, 70.3 Parts by weight of the resin Resapol HT from above, 14 parts by weight of a 30 weight percent gel polyester resin, and 15.7 parts by weight of the predispersion containing Pigment Red 81:2 and UVINUL™ 4049 H are blended together and extruded in a ZSK-40 extruder. The remainder of the toner preparation, developer preparation, and print sample generation were substantially identical to that of Example I.

The print samples were then exposed in an industry standard Xenon accelerated fadeometer test that simulates daylight through a window and evaluated for dE color differences. Reflection color measurements were tested before and after exposure corresponding to 0, 24, and 72 hour exposure intervals. The color difference between the unexposed (cardboard masked) and exposed image at each exposure time was less than about 5, such as about 3 dE units.

EXAMPLE III

700 Grams of a linear propoxylated bisphenol A fumarate resin referred to as Resapol HT were heated to approximately 80° C. To this resin were added approximately 600 grams of a Pigment Red 81:2 wetcake, which consisted of approximately 150 grams of Pigment Red 81:3 pigment and approximately 450 grams of water. The resin and wetcake mixture was blended in a high-shear kneading device for a time sufficient to allow the water in the mixture to rise to the surface and be decanted off. An additional 300 grams of wetcake were added to the mixture and kneaded a second time to allow the water in the mixture to rise to the surface and be decanted off. The process was repeated a third time with a final addition of 300 grams of wetcake and after the third decanting of water, 1 gram of Lowilite 77 UV stabilizer was added to the mixture. This stabilizer, a sterically hindered amine, was a white powder that had low solubility in water, a melting point of about 80° C. to about 85° C., was thermally stable to approximately 200° C., and is available from Great Lakes Chemical. Following the addition of the Lowilite 77, the temperature of the mixture was raised to 100° C. and a vacuum was applied to the mixture to remove the remaining water from the dispersion. The final dispersion consisted of approximately 69.7 percent by weight of the linear polyester resin, approximately 30 percent by weight of Pigment Red 81:2, and approximately 0.3 percent by weight of Lowilite 77, and it was believed that due to the limited compatibility of the Lowilite 77 with the polyester resin, the Lowilite 77 would effectively coat the pigment particles. In the second step of the process, 70.3 parts by weight of the resin Resapol HT from above, 14 parts by weight of a 30 weight percent gel polyester resin, and 15.7 parts by weight of the predispersion containing Pigment Red 81:2 and Lowilite 77 were blended together and extruded in a ZSK-40 extruder. The remainder of the toner preparation, developer preparation, and print sample generation were substantially similar to that of Example I.

The print samples were then exposed in an industry standard Xenon accelerated fadeometer test that simulated daylight through a window and evaluated for dE color differences. Reflection color measurements were tested before and after exposure corresponding to 0, 24, and 72 hour exposure intervals. The color difference between the unexposed (cardboard masked) and exposed image at each exposure time was less than 5 dE units, for example about 3.75 dE units.

EXAMPLE IV

700 Grams of a linear propoxylated bisphenol A fumarate resin referred to as Resapol HT was heated to approximately 80° C. To this resin were added approximately 600 grams of a Pigment Red 81:2 wetcake, which consisted of approximately 150 grams of Pigment Red 81:3 pigment and approximately 450 grams of water. The resin and wetcake mixture was blended in a high-shear kneading device for a time sufficient to allow the water in the mixture to rise to the surface and be decanted off. An additional 300 grams of wetcake were added to the mixture and kneaded a second time to allow the water in the mixture to rise to the surface and be decanted off. The process was repeated a third time with a final addition of 300 grams of wetcake and after the third decanting of water, 1 gram of Cyasorb UV-5411 UV stabilizer was added to the mixture. This stabilizer was a white of off-white powder that had low solubility in water, a melting point of about 103° C. to about 105° C., was thermally stable at elevated temperatures, and was available from Cytec Corporation. Following the addition of the Cyasorb UV-5411, the temperature of the mixture was raised to 100° C. and a vacuum was applied to the mixture to remove the remaining water from the dispersion. The final dispersion consisted of approximately 69.7 percent by weight of the linear polyester resin, approximately 30 percent by weight of Pigment Red 81:2, and approximately 0.3 percent by weight of Cyasorb UV-5411, and it was believed that due to the limited compatibility of the Cyasorb UV-5411 with the polyester resin, the Cyasorb UV-5411 will effectively coat the pigment particles. In the second step of the process, 70.3 parts by weight of the resin Resapol HT from above, 14 parts by weight of a 30 weight percent gel polyester resin, and 15.7 parts by weight of the predispersion containing Pigment Red 81:2 and Cyasorb UV-5411 were blended together and extruded in a ZSK-40 extruder. The remainder of the toner preparation, developer preparation, and print sample generation were identical to that of Example I.

The print samples were then exposed in an industry standard Xenon accelerated fadeometer test that simulates daylight through a window and evaluated for dE color differences. Reflection color measurements were tested before and after exposure corresponding to 0, 24, and 72 hour exposure intervals. The color difference between the unexposed (cardboard masked) and exposed image at each exposure time was less than 5 dE units, for example about 3 dE units.

EXAMPLE V

In the first step of the process, 700 grams of a linear propoxylated bisphenol A fumarate resin referred to as Resapol HT was heated to approximately 80° C. To this resin were added approximately 600 grams of a Pigment Red 81:2 wetcake, which consisted of approximately 150 grams of Pigment Red 81:3 pigment and approximately 450 grams of water. The resin and wetcake mixture was blended in a high-shear kneading device for a time sufficient to all the water in the mixture to rise to the surface and be decanted off. An additional 300 grams of wetcake were added to the mixture and kneaded a second time to allow the water in the mixture to rise to the surface and be decanted off. The process was repeated a third time with a final addition of 300 grams of wetcake and after the third decanting of water, 1 gram of UVASIL™ 299HM/299LM UV stabilizer, polymethyl[propyl-3-oxy(2,2,6,6-tetramethyl)-4-piperidinyl] siloxane, was added to the mixture. This stabilizer was a yellow liquid that has low miscibility with water, a melting point of −28° C., was thermally stable at elevated temperatures, and was available from Great Lakes Chemical. Following the addition of the UVASIL™ 299HM/299LM, the temperature of the mixture was raised to 100° C. and a vacuum was applied to the mixture to remove the remaining water from the dispersion. The final dispersion consisted of approximately 69.7 percent by weight of the linear polyester resin, approximately 30 percent by weight of Pigment Red 81:2, and approximately 0.3 percent by weight of UVASIL™ 299HM/299LM, and it was believed that due to the limited compatibility of the UVASIL™ 299HM/299LM with the polyester resin, the UVASIL™ 299HM/299LM will effectively coat the pigment particles. In the second step of the process, 70.3 parts by weight of the resin Resapol HT from above, 14 parts by weight of a 30 weight percent gel polyester resin, and 15.7 parts by weight of the predispersion containing Pigment Red 81:2 and UVASIL™ 299HM/299LM were blended together and extruded in a XSK-40 extruder. The remainder of the toner preparation, developer preparation, and print sample generation were identical to that of Example I.

The print samples were then exposed in an industry standard Xenon accelerated fadeometer test that simulated daylight through a window and evaluated for dE color differences. Reflection color measurements were tested before and after exposure corresponding to 0, 24, and 72 hour exposure intervals. The color difference between the unexposed (cardboard masked) and exposed image at each exposure time was less than 5 dE units.

Other embodiments and modifications of the present invention may occur to those skilled in the art subsequent to a review of the information presented herein, these embodiments and modifications, equivalents thereof, substantial equivalents thereof, similar equivalents thereof, and the like are also included within the scope of this invention.

What is claimed is:

1. A toner comprised of resin and colorant, and wherein the colorant is stabilized with a UV component, and which stabilized colorant is generated by mixing a colorant dispersion with said UV component and wherein said UV component forms a coating on said colorant.

2. A toner in accordance with claim 1 wherein the resulting stabilized colorant is admixed with said toner resin.

3. A toner in accordance with claim 1 wherein said coating is of a thickness of from about 0.01 to about 1 micron.

4. A toner in accordance with claim 1 wherein said resin is a styrene acrylate, a styrene methylmethacrylate or mixtures thereof.

5. A toner in accordance with claim 1 wherein said resin is a polyester.

6. A toner in accordance with claim 1 wherein the colorant is a cyan, black, magenta, yellow or mixtures thereof with from about 20 to about 60 weight percent of colorant solids.

7. A toner in accordance with claim 1 wherein said colorant is carbon black.

8. A toner in accordance with claim 1 wherein said colorant is a dye.

9. A toner in accordance with claim 1 wherein said colorant is a pigment.

10. A toner in accordance with claim 1 wherein said colorant is comprised of cyan, yellow, magenta, black, green, orange, violet or brown, and wherein each colorant is present in an amount of from about 2 weight percent to about 20 weight percent of the toner.

11. A toner in accordance with claim 1 wherein said toner contains blended dry powder additives on the toner surface, and which additives are comprised of metal salts, metal salts of fatty acids, colloidal silicas, metal oxides, or mixtures thereof, and which additives are each optionally present in an amount of from about 0.1 to about 2 weight percent.

12. A toner in accordance with claim 1 wherein said colorant is present in an amount of from about 2 to about 15 weight percent.

13. A toner in accordance with claim 1 wherein said colorant is present in an amount of from about 5 to about 12 weight percent.

14. A toner in accordance with claim 1 wherein said colorant is present in an amount of from about 5 to about 12 weight percent, and said stabilizer is present in an amount of from about 0.1 to about 4 weight percent based on the weight of said colorant and said stabilizer.

15. A toner in accordance with claim 1 wherein said stabilizer is a benzophenone, a benzotriazole, a salicylate, a nickel organic, a monobenzoate, a formamidene, an oxalanilide or a hindered phenol.

16. A toner in accordance with claim 1 wherein said stabilizer is a benzophenone.

17. A toner in accordance with claim 1 wherein said stabilizer is a benzotriazole.

18. A toner in accordance with claim 14 wherein said stabilizer is a benzophenone and a benzotriazole.

19. A developer comprised of the toner of claim 1 and carrier.

20. A developer comprised of the toner of claim 1 and carrier particles, and which carrier particles contain a polymeric coating.

21. A process for the preparation of a toner comprised of mixing a stabilized colorant dispersion with a resin, and wherein the stabilized colorant dispersion is generated from a mixture of a colorant dispersion and a stabilizer, and wherein said stabilizer forms a coating on said colorant.

22. A toner in accordance with claim 1 wherein said resin is a linear propoxylated bisphenol A fumarate polyester resin.

23. A toner in accordance with claim 1 wherein said colorant is a magenta pigment.

24. A toner in accordance with claim 22 wherein said resin is the reactive extrusion crosslinked product of a linear polyester and a crosslinking initiator.

25. A toner composition comprised of resin and colorant, and wherein the colorant is stabilized with an ultraviolet stabilizer, and which stabilizer forms a coating on said colorant.

26. A toner comprised of resin and colorant, and wherein the colorant is stabilized with a UV component, and which stabilized colorant is generated by mixing a colorant dispersion with said UV component, and wherein said UV component forms a coating on said colorant, and wherein said coating is of a thickness of from about 0.01 to about 1 micron.

* * * * *